US007986795B2

(12) United States Patent
Tsang

(10) Patent No.: US 7,986,795 B2
(45) Date of Patent: Jul. 26, 2011

(54) METHOD AND APPARATUS FOR PROTECTING MEDIA CONTENT AGAINST UNAUTHORIZED DUPLICATION

(76) Inventor: Wing Hon Tsang, Hong Kong (CN)

( * ) Notice: Subject to any disclaimer, the term of this patent is extended or adjusted under 35 U.S.C. 154(b) by 1203 days.

(21) Appl. No.: 11/673,178

(22) Filed: Feb. 9, 2007

(65) Prior Publication Data

US 2008/0192943 A1 Aug. 14, 2008

(51) Int. Cl.

*H04B 15/00* (2006.01)
*H04R 1/40* (2006.01)
*G06K 17/00* (2006.01)
*H04N 7/167* (2011.01)

(52) U.S. Cl. ............ 381/94.9; 381/97; 700/94; 380/236

(58) Field of Classification Search .................... 700/94; 369/30.27–30.29, 174; 381/94.9, 97, 310, 381/120; 380/201, 203, 207, 208, 210, 222, 380/235–238

See application file for complete search history.

(56) References Cited

U.S. PATENT DOCUMENTS

| | | | | | |
|---|---|---|---|---|---|
| 2,551,068 | A | * | 5/1951 | Striker | 380/236 |
| 2,872,507 | A | * | 2/1959 | Druz | 380/236 |
| 2,939,916 | A | * | 6/1960 | Miller | 380/236 |
| 4,086,634 | A | | 4/1978 | Cook | |
| 4,638,357 | A | * | 1/1987 | Heimbach | 380/238 |
| 4,956,862 | A | * | 9/1990 | Robbins et al. | 380/238 |
| 5,471,531 | A | * | 11/1995 | Quan | 380/238 |
| 6,674,864 | B1 | * | 1/2004 | Kitamura | 381/103 |
| 7,146,008 | B1 | * | 12/2006 | Hannah et al. | 380/236 |

FOREIGN PATENT DOCUMENTS

| | | | |
|---|---|---|---|
| GB | 2164481 | A | 3/1986 |
| GB | 2199689 | A | 7/1988 |
| WO | WO-99/57723 | A2 | 11/1999 |

* cited by examiner

*Primary Examiner* — Curtis Kuntz
*Assistant Examiner* — Jesse A Elbin
(74) *Attorney, Agent, or Firm* — Ella Cheong Hong Kong; Margaret Burke; Sam T. Yip

(57) ABSTRACT

Methods and apparatuses for media playback system are disclosed, including a signal source for providing electrical signal representing media content; a processing unit for processing signal from the signal source; a distorting unit for introducing distortion to signal from the processing unit; a transducer for converting the electrical signal from the distorting unit to energy representing the media content; and a connection link for transmitting the signal from the distorting unit to the transducer. The arrangement protects media content against unauthorized duplication by ripping-off the transmitting signal.

20 Claims, 7 Drawing Sheets

METHOD AND APPARATUS FOR PROTECTING MEDIA CONTENT AGAINST UNAUTHORIZED DUPLICATION

BACKGROUND OF THE INVENTION

1. Field of the Invention

The present invention relates generally to media content protection, in particular to protection against signal duplication in media playback devices.

2. Description of Related Art

Content rights management relates to the management of the rights to own or use the content in the form of books, tapes, TV or radio broadcasting, and other information expression. In particular, the management method controls the usage rights in respect to the frequency and duration to view, copy, loan, edit, print, exchange and transfer.

In this computer age, content rights management is more emphasized in copyright protection in the area of digital media than that of the analog media. There are two reasons regarding the static and dynamic aspects. Firstly, digital content may exist as an archive (static), which can be easily copied or duplicated to give the original quality of media content. Secondly, digital content can be easily distributed (dynamic) in the fast and convenient Internet connection.

As for analog format media content, the case is totally different. It has to be carried in an analog physical media such as tape for audio/video, paper for text/photo, etc. When the content is to be copied and distributed, such analog content requires time-consuming and high cost methods to retain original quality of media content and hence discourage piracy issues.

Therefore, there exist prior art to protect and prevent digital audio media from ripping in personal computer to stop music piracy. The methods include incorporating protection in CD, DVD, and encrypting the compressed audio content therein.

The on-line music subscription is becoming popular and successful, for example, in the case of Apple's iPod, where it has over one million songs per month downloaded from its iTune web site. This implies that the on-line music subscription business model would create new music distribution channels, in contrast with the conventional compact discs in retail shops, and the consumer is prepared to accept the same.

Currently, there are five essential parties to construct an on-line music subscription business, namely the content provider, distributor, retailer, playback device manufacturer, and music consumer. The content provider is a music publisher (BMG, Sony, Warner, Universal, etc), that relies heavily on the distributor (Apple, Microsoft, Napster, Sony, Intel, Yahoo, Google, etc.) to provide content protection, security, rights management and distribution infrastructure services.

The retailers are the Internet portals (Yahoo, Google, MSN etc.) and shopping web sites (Amazon, Wal-Mart, iTune, Napster, Microsoft, etc.). The playback device manufacturer (Philips, Samsung, Creative, JNC, etc) produces compliance devices according to the distributor's requirement to implement the rights management, security and protection scheme. Finally, the music consumer subscribes to the music download service, and they may also join subscription plans to get a free or discounted media player, mp3 player or mobile phone, etc. for playback of the media content.

The distributor provides very intensive security and protection to block direct digital copy. Despite these intended measures, some current analog ripping and audio recording devices can duplicate very high quality media content by re-sampling at the analog output of playback devices (such as at the connector output for headphones or speakers). The dubbed data can be converted into a digital signal providing comparable quality as the original content. After that, it can easily be transformed into different digital formats such as mp3, WMA, etc. and distributed over the Internet, resulting in piracy problems. There is no current feasible solution to stop or discourage such analog rip-off from the audio output connector.

Thus, this analog loophole has become the Achilles' heel of Digital Rights Management (DRM) technology. Accordingly, a need yet exists for improved methods and apparatuses that protect media content against duplication at the media playback stage.

BRIEF SUMMARY OF THE INVENTION

According to a first preferred aspect of the present invention, there is provided a media playback apparatus. The apparatus comprises: a signal source for providing an electrical signal representing media content; a processing unit for processing the signal from said signal source; a distorting unit for introducing distortion to signal from said processing unit; a transducer for converting the electrical signal from said distorting unit to energy representing said media content; and a connection link for transmitting the signal from said compensating unit to said transducer.

The distorting unit can be a compensating unit for introducing compensation to the signal before transmitting the same through said connection link; said compensation is substantially an inverse function of the distortion caused by said transducer.

The distorting unit can also be a modulator; said media playback apparatus further comprises a demodulator for demodulating the signal from said modulator, said demodulator, which provides an inverse function of the distortion, substantially eliminates the distortion introduced by said modulator.

The media playback apparatus can further comprise a digital encoder coupled between said distorting unit and said connection link; and a digital decoder coupled between said connection link and said transducer; wherein said digital encoder encodes a signal from said distorting unit to a digital signal representing information by variation of characteristics selected from the group consisting of pulse width, frequency, and amplitude; said digital decoder decoding said digital signal into a signal equivalent to said signal output by said distorting unit.

The media playback apparatus can further comprise a digital-to-analog converter for converting the digital signal from said distorting unit to an analog signal.

The distorting unit can introduce distortion such as phase, amplitude and frequency.

The distorting unit can introduce distortion in a multi-band manner.

The distorting unit can introduce distortion in a multi-channel manner.

The encoder can further introduce shaping noise to the digital signal for increasing the data rate of said digital signal.

The media content can be an audio signal.

The signal source can be a means for data storage, broadcasting, or streaming data.

BRIEF DESCRIPTION OF THE DRAWINGS

One or more embodiments are described hereinafter, by way of examples only, with reference to the accompany drawings in which.

DETAILED DESCRIPTION OF PREFERRED EMBODIMENTS

Figure 1:
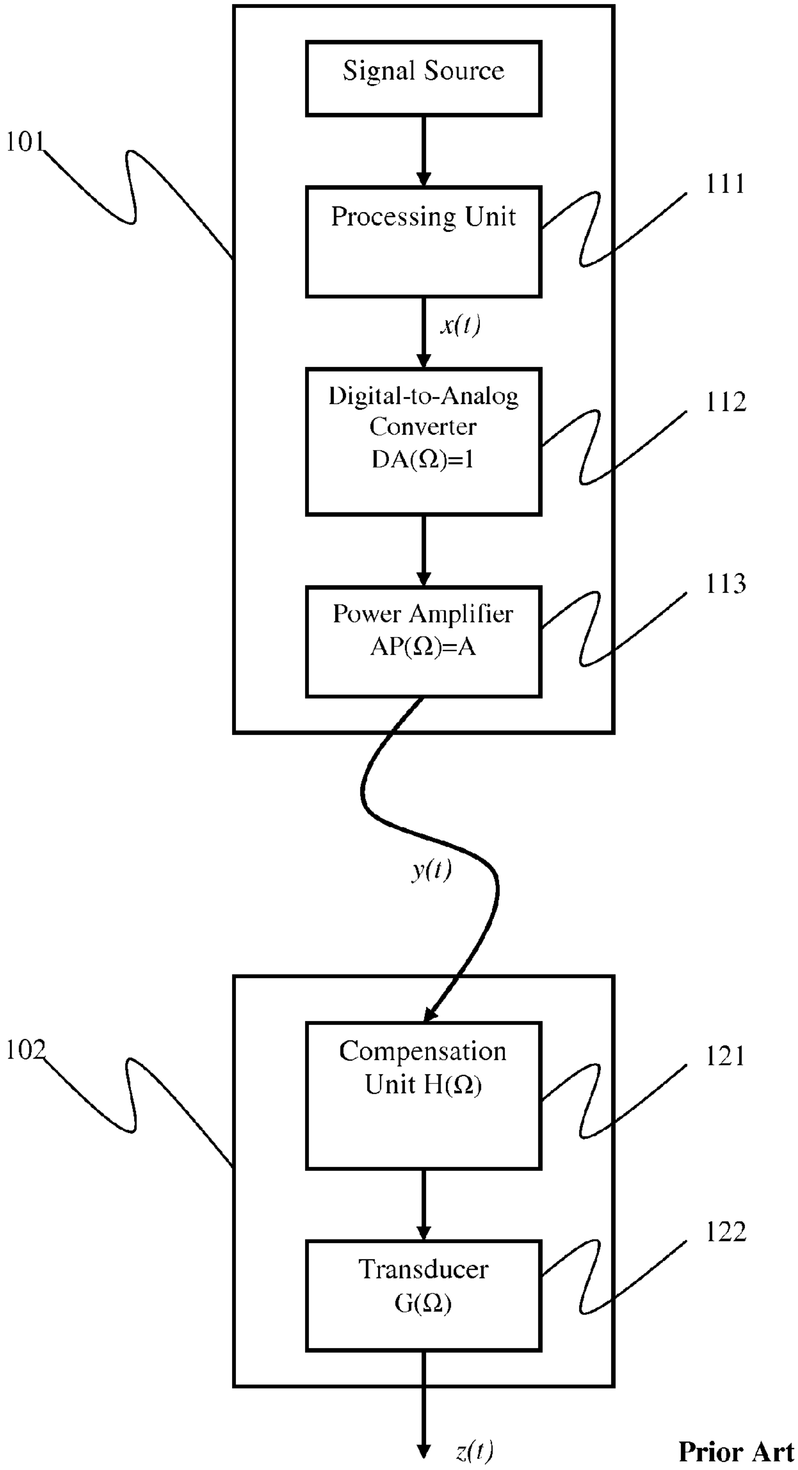
Prior Art FIG. 1
FIG. 1 is a block diagram of a legacy system for media playback.

Embodiments of methods, apparatuses and systems are described hereinafter for protecting media content against duplication at the playback stage. Embodiments described hereinafter refer to legacy systems for audio media playback. However, it is not intended that the present invention be limited in this manner, as other media playback systems may also be catered for, which may include, for example, a compressed audio (mp3, WMA, etc.) player, mp4 player, PSP, mobile phone, and high definition digital broadcasting radio. From this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same functions(s) or operations(s), unless the contrary intention appears.

Aspects of the present invention relate to methods, apparatuses and systems for protecting media content against duplication at the playback stage. The present invention proposes methods to plug the analog loophole in the playback device and provide the on-line music subscription business with a complete solution to suppress rip-off.

For an ideal electroacoustic transducer, the relationship between input electrical audio signal and output acoustic pressure should be linear. In practice, the relationship is not linear and amplitude distortion is generated due to asymmetric non-linearity magnetic or electric fields, of which the strength changes with diaphragm position. Moreover, the suspension structure of the diaphragm causes damping of the motion due to non-linear viscous friction and elasticity, and hence the delay response problem. This delay is also regarded as phase distortion, which is more serious in the high acoustic frequencies.

A legacy sound reproduction system is expected to give flat frequency response at each stage of the electroacoustic transmission. The stages include the signal storage medium (e.g. compact disc, magnetic tape, compressed file, etc), signal source retrieving unit (e.g. optical pickup, magnetic head, file retrieve, broadcasting receiver, data streaming collector, etc), power amplifier (e.g. analogy and digital type) and electroacoustic transducer (e.g. loudspeaker and headphone). Therefore, the distortion caused by the electroacoustic transducer itself must be compensated. A common method is by the use of acoustic elements such as volume compliance in the chamber structure, resonance tube, piston membrane structure and even the electronic circuit. This approach provides the advantage of a normalized/standardized interface for the amplifier output such that the interface is compatible with different amplifier systems' output.

FIG. 1 shows a block diagram of a conventional sound reproduction system 101 and an electroacoustic transducer 102. The music signal source is mainly from digital domain such as CD, compressed audio, high definition digital broadcasting radio, data streaming, etc. The processing unit 111 performs music playback and content decompression. The digital-to-analog converter 112 changes the digital signal into an analog signal. The analog signal is further amplified by the analog power amplifier 113 and drives the compensated transducer 102 via external connecting wires.

The frequency response of the (electroacoustic) transducer 122 can be expressed as the following formula $$G(\Omega)\neq 1 \tag{1}$$

where Ω is an input frequency from the music source. G is the frequency response function dependent on Ω, and it is not equal to unit meaning that it does not provide constant frequency response in amplitude and phase.

Therefore, the ideal compensation unit 121 is to cancel out the non-constant frequency response from G to produce non-distortion acoustic pressure output such that $$H(\Omega)\cdot G(\Omega)=1 \tag{2}$$

where H(Ω) is the frequency response function of the compensation unit 121 and is an inverse function of G(Ω) (such that H(Ω)≠1);

where G(Ω)≠1 is the distortion of the electroacoustic transducer 122 and Ωis an input frequency from the music source.

FIG. 1 also depicts the relationship of these frequency response functions and the input, output signals. DA(Ω) and AP(Ω) are supposed to be ideal flat response (not dependent on frequency of signal) for ease of illustration. In addition, the analog power amplifier provides gain A in the signal path.

For an input frequency Ω, the source input is represented as $$x(t)=e^{j\Omega t} \tag{3}$$

Then the output y(t) can be represented as $$\begin{aligned} y(t) &= DA(\Omega)\cdot AP(\Omega)\cdot e^{j\Omega t} \\ &= A\cdot e^{j\Omega t} \\ &= A\cdot x(t) \end{aligned} \tag{4}$$

and the acoustic pressure output z(t) becomes $$z(t)=A\cdot e^{j\Omega t}\cdot H(\Omega)\cdot G(\Omega) \tag{5}$$

Since H(Ω) is an ideal compensation of distortion G(Ω), $$z(t) = A\cdot e^{j\Omega t} = A\cdot x(t)$$

Therefore, the ideal acoustic pressure output z(t) is a gained reproduction of the source input x(t). In view of the above, the output y(t) of the sound reproduction system 101, is not protected, and can be ripped-off easily from the connection to electroacoustic transducer 102. The audio signal x(t) can easily be reproduced in other electroacoustic transducers from the rip-off signal y(t).

Figure 2A:
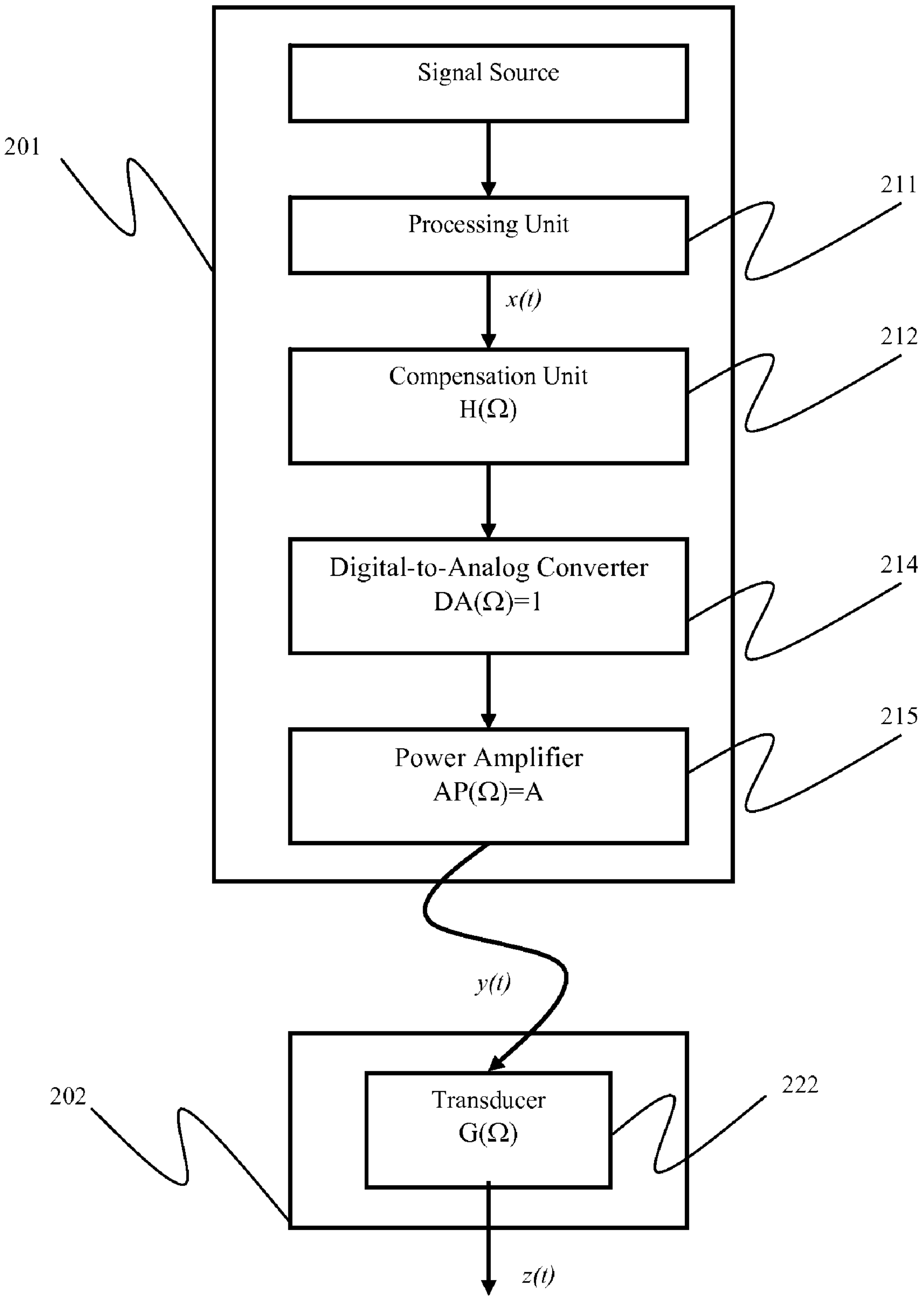
FIG. 2*a* is a block diagram of a system for media playback with compensation unit installed in the sound reproduction system in accordance with a preferred embodiment of the present invention.

The present invention provides methods and apparatuses to defeat ripping at the output of the sound reproduction system 101. In one preferred embodiment of the present invention, an audio playback apparatus utilizes the non-linear distortion feature of the electroacoustic transducer to introduce distortion on the signal transmitted over the cable. FIG. 2 shows an audio playback apparatus having the compensation unit 212 installed at the sound reproduction system 201. The compensation unit 212 has the same function as the compensation unit 121 in the legacy system of FIG. 1, and serves to compensate distortion caused by the transducer 222 of an electroacoustic transducer system 202 in order to recover the equivalent original signal at the transducer output. Such arrangement purposely changes the original electrical audio signal on the cable into a compensating electrical signal, which is substantially different from the original content. As such, the signal that can be ripped-off from the cable connector output is the compensating electrical audio signal instead of the original one. The processing unit 211 performs music playback and content decompression. The digital-to-analog converter 214 changes the digital signal into an analog signal. The analog signal is further amplified by the analog power amplifier 215.

In order to induce the compensating electrical audio signal an undesired quality, the acoustic elements such as volume compliance in the chamber structure, resonance tube, piston membrane structure, even the electronic circuit is used to provide further distortion. The additional distortion from the acoustic elements can be totally compensated by the compensation unit 212 of the sound reproduction system 201 to restore an original acoustic pressure signal. In the meantime, the rip-off from the compensating electrical audio signal is discouraged by such an unpleasant audio signal.

Figure 2B:
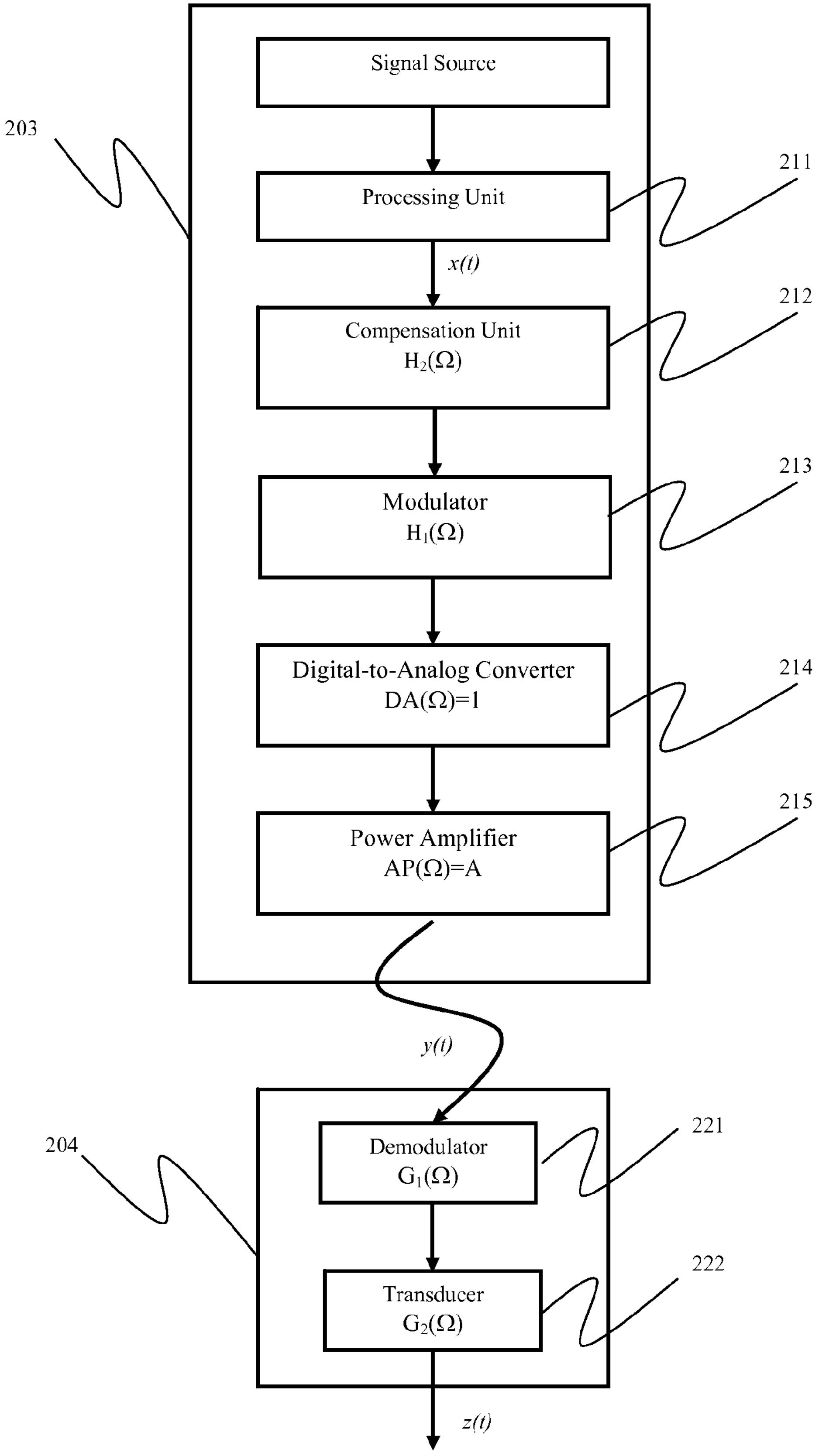
FIG. 2*b* is a block diagram of a system for media playback with modulator and demodulator in accordance with a preferred embodiment of the present invention.

FIG. 2*b* is a block diagram of a system for media playback in accordance with another embodiment of the present invention. Further distortion is introduced by a modulator 213 to the signal transmitting from the sound reproduction system 203 to an electroacoustic transducer system 204 through connecting wires. The non-linear distortion of the electroacoustic transducer system 204 comes from the electroacoustic transducer device 222 itself and added acoustic elements which function as a demodulator 221. Compensation unit 212 and modulator 213 are designed to match such demodulator 221 and transducer 222 in a way that the transfer function of the modulator 213 and compensation unit 212 are the inverse of demodulator 221 and transducer 222 respectively. The compensation unit 212 and modulator 213 jointly produce an undesired electrical audio signal in the external wire connecting the sound reproduction system 203 and the electroacoustic transducer system 204.

For example, if the modulator 213 can invert the phase in one channel of a stereo electroacoustic transducer, then the sound represented by the distorted signal on the cable shifts to one side and loses the center of focus of the stereo signal. This introduced phase distortion can be easily eliminated by the demodulator 221 which inverts the phase of the output signal of that channel.

The modulator 213 can introduce various kinds of distortion. Therefore, the degree of the unpleasant audio signal can be adjusted by different extent based on the requirement of the application.

The modulator 213 can be integrated with the compensation unit 212, for example, by substituting with a single signal processing unit that performs both the functions of the modulator 213 and compensation unit 212.

The present invention is thus distinct from the conventional design that chooses the most linear response electroacoustic transducer to make acoustic element compensation easier or even unnecessary. For the present invention, the design rule is released to allow choosing a lower cost and/or lower power consumption electroacoustic transducer.

In order to explain the distortion effect on listening, an example system is presented to illustrate how the compensation works and the unacceptable distorted output signal is provided instead of the original one.

In general, the non-linear distortion on the pair of electroacoustic transducers is the same, so that this symmetry distortion does not change the center focus of the signal if the two channels deliver the same signal such as the voice of a singer or presenter. In the following illustration, the non-linear distortion is assumed to be negligible so that an artificial distortion is only implemented in one channel.

According to a preferred embodiment of the invention, the out of phase distortion is deliberately constructed by reversing the direction winding of the left magnetic coil with respect to the right one. The compensating electrical signal of the left channel of a stereo output is made 180 degrees out of phase with respect to the right channel.

Figure 3:
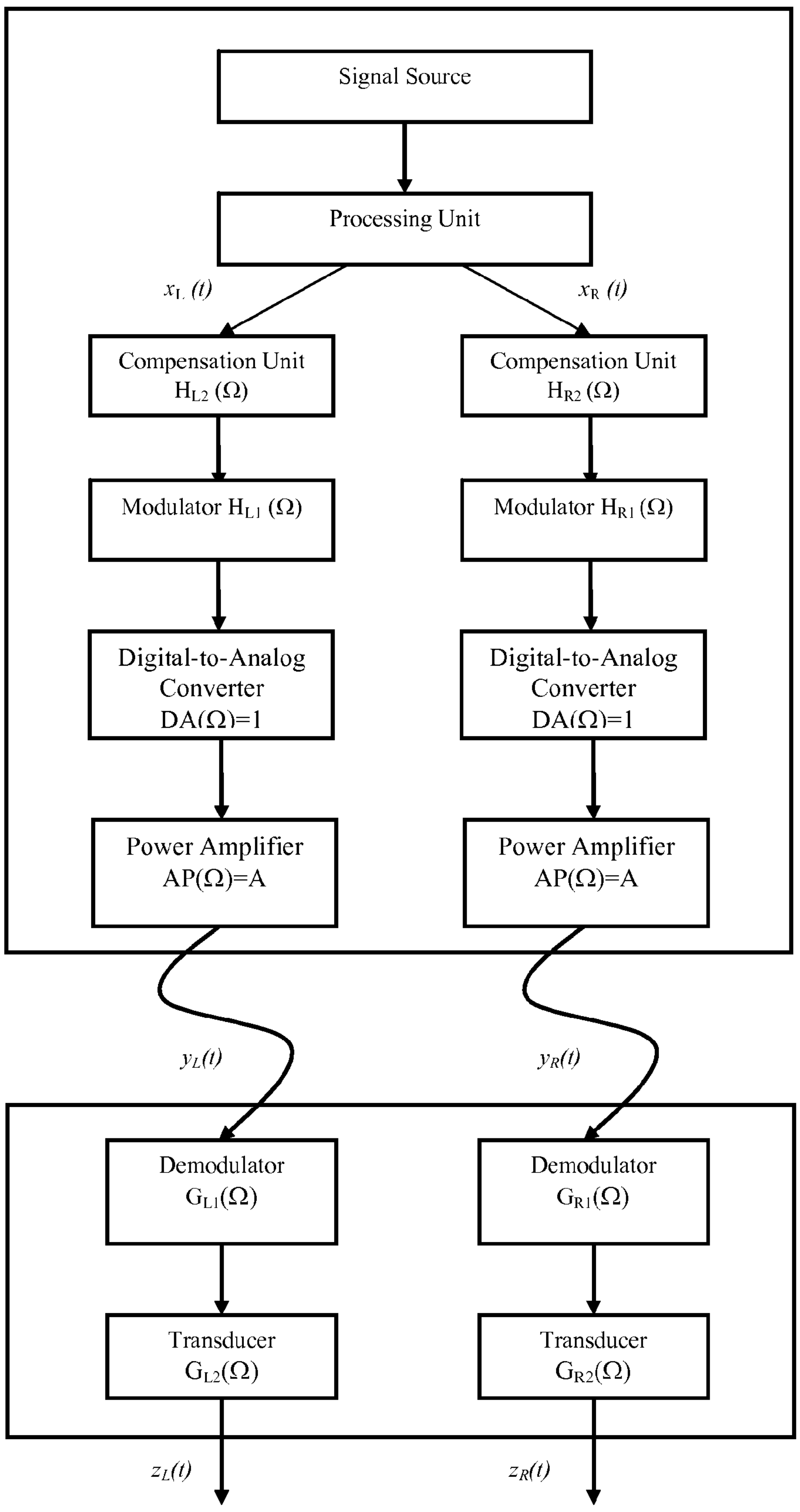
FIG. 3 shows a block diagram of a system for media playback with phase distortion on left and right channels in accordance with another preferred embodiment of the present invention.

FIG. 3 shows the system block diagram of the left and right channels, illustrating the frequency responses of the components and the input-output signals. Suppose the right channel frequency response function is nearly ideal and is approximately represented as follows:

$$G_{R1}(\Omega)=1,\ G_{R2}(\Omega)=1,\ \text{so that } H_{R1}(\Omega)=1,\ H_{R2}(\Omega)=1$$

Then its distorted output $y_R(t)$ is represented as $$y_R(t) = H_{R2}(\Omega)\cdot H_{R1}(\Omega)\cdot DA(\Omega)\cdot AP(\Omega)\cdot e^{j\Omega t} = A\cdot e^{j\Omega t} \tag{6}$$

and its acoustic pressure output $Z_R(t)$ is represented as $$z_R(t) = A\cdot e^{j\Omega t}\cdot G_{R1}(\Omega)\cdot G_{R2}(\Omega) = A\cdot x_R(t) \tag{7}$$

As the frequency response of the left channel is 180 degrees out of phase with respect to the right channel, $$G_{L2}(\Omega) = e^{j\Omega t} = -1$$

Accordingly, the frequency response of compensation modulator should be $H_{L2}(\Omega)=-1$ Moreover, $G_{L1}(\Omega)=1$ and $H_{L1}(\Omega)=1$ Then the distorted output $y_L(t)$ is represented as $$\begin{aligned} y_L(t) &= H_{L2}(\Omega)\cdot H_{L1}(\Omega)\cdot DA(\Omega)\cdot AP(\Omega)\cdot e^{j\Omega t} \\ &= A\cdot H_L(\Omega)\cdot e^{j\Omega t} \\ &= -A\cdot e^{j\Omega t} \end{aligned} \tag{8}$$

Finally, the acoustic pressure output $Z_L(t)$ is a gained reproduction of $x_L(t)$ $$\begin{aligned} z_L(t) &= -A\cdot e^{j\Omega t}\cdot G_{L1}(\Omega)\cdot G_{L2}(\Omega) \\ &= -A\cdot e^{j\Omega t}\cdot -1 \\ &= A\cdot x_L(t) \end{aligned} \tag{9}$$

If the music is ripped out from the analog output lines, then $y_L(t)$ and $y_R(t)$ constitute a distorted stereo reproduction output in another player; the listener feels that the center of voice is not in the midway of two ears and its focus becomes not solid and shifting. It is due to the 180 degrees out of phase distortion, which delays the left channel signal by a half wavelength of an input frequency $\Omega$shown in FIG. 4 and the half wavelength is calculated as $$\frac{\lambda}{2} = \frac{V}{2.\Omega} \tag{10}$$

where V=345 m/s—the velocity of sound propagating in air (at sea level, approximate 22° C. and 50% relative humidity).

Figure 4:
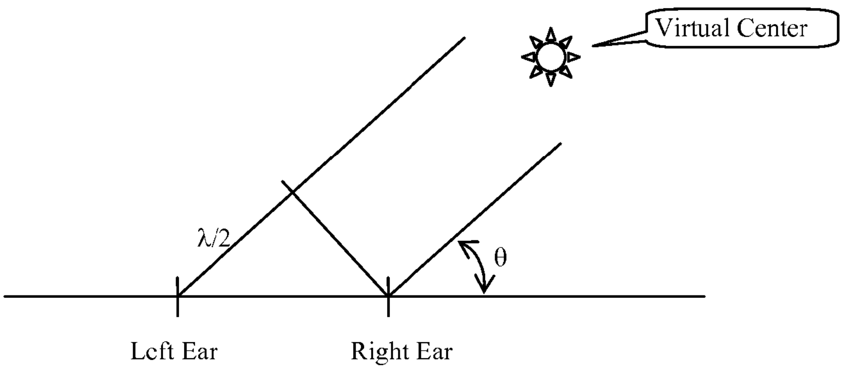
FIG. 4 shows the location of the virtual center of focus after phase distortion provided by a preferred embodiment of the present invention.

Suppose that the distance between the two ears of a listener is around 0.25 m, then the angle θ shown in FIG. 4 is defined as the direction of the virtual center. It is calculated by $$\theta = \cos^{-1}\left(\frac{\lambda/2}{0.25}\right) \tag{11}$$

Figure 5:
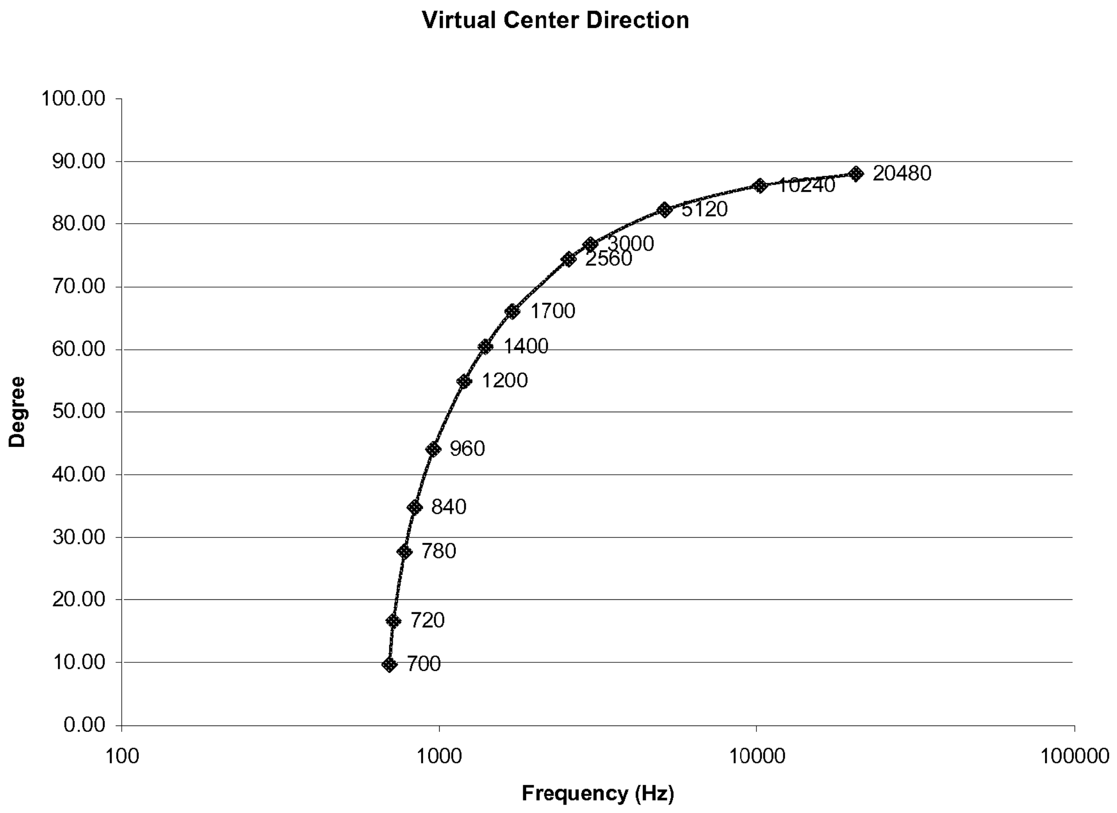
FIG. 5 shows the change of virtual center direction caused by 180 degree out of phase distortion in one channel according to a preferred embodiment of the present invention.

The graph showing the input frequency against the angle θ is plotted in the graph of the FIG. 5. The vertical axis is the angle θ in degrees, and the horizontal axis is the input frequency in Hertz. Referring to the graph, the 180 degrees out of phase distortion is difficult to identify when the input frequency is below about 700 Hz. For signal of high frequency, the interpretation is the same; the delay becomes smaller and is also difficult to be identified as a distorted version. In reality, music is not of a single tone frequency, nor concentrates only in the high frequency band or low frequency band. A singer's voice and mid-tone music are always located between 700 Hz and 3000 Hz. According to this frequency range shown in the graph, the virtual center direction is between 10 degrees and 76 degrees. Therefore, this effect causes the focus of audio source becoming not solid and shifting. Specifically, this distortion effect is more significant in the frequency band of the human voice, and makes pirated copies unacceptable.

In case the compensated electrical audio signal is ripped-off, there are three scenarios to be considered. Firstly, if the ripped-off signal is the playback in a conventional sound reproduction system 101 and electroacoustic transducer 102 of FIG. 1, an unpleasant audio signal is heard.

Secondly, if the ripped-off signal is the playback in the proposed sound reproduction system 203 and electroacoustic transducer 204 of FIG. 2*b*, it is modulated one more time and produces an even worse and unpleasant audio signal than the first case.

The last case is the combination of the former two systems, using the conventional sound reproduction system 101 and connecting the electroacoustic transducer 204 instead of its compensated electroacoustic transducer 102. As such, the modulated electrical audio signal is the playback in the conventional sound reproduction system 101 and demodulated at electroacoustic transducer 204. Therefore, the original audio signal is obtained and in such case, the aforesaid compensation modulation method seems to fail in protecting the media content.

Any one or more of the following four methods can be adopted to further solve the above problem.

Firstly, a connector of special physical properties can be used in the electroacoustic transducer system 204 making it difficult if not impossible to couple to the conventional sound reproduction system 101. Moreover, each channel of the audio content can use more than one electroacoustic transducer, and they are directly driven by the proposed sound reproduction system 203 so that each channel uses more than one pair of wires to make it incompatible with the conventional sound reproduction system 101.

Secondly, the non-linear distortion of the electroacoustic transducer is highly dependent on the material used in the driver, diaphragm size, suspension structure, and appearance decoration. In these cases, the demodulator characteristics are changed according to different industrial design requirements. As a result, the ripped-off archive becomes less useful, because it only works with dedicated electroacoustic transducer system 204. This can reduce the interest to distribute the archive over the Internet.

Thirdly, the cable is non-detachable by the user and the media player is firmly connected to the electroacoustic transducers. A built-in cable management system in the media player is more feasible for this usage. Such a cable management system can be implemented by winding the cable on devices such as retractable reel or yo-yo cord winder.

Figure 6:
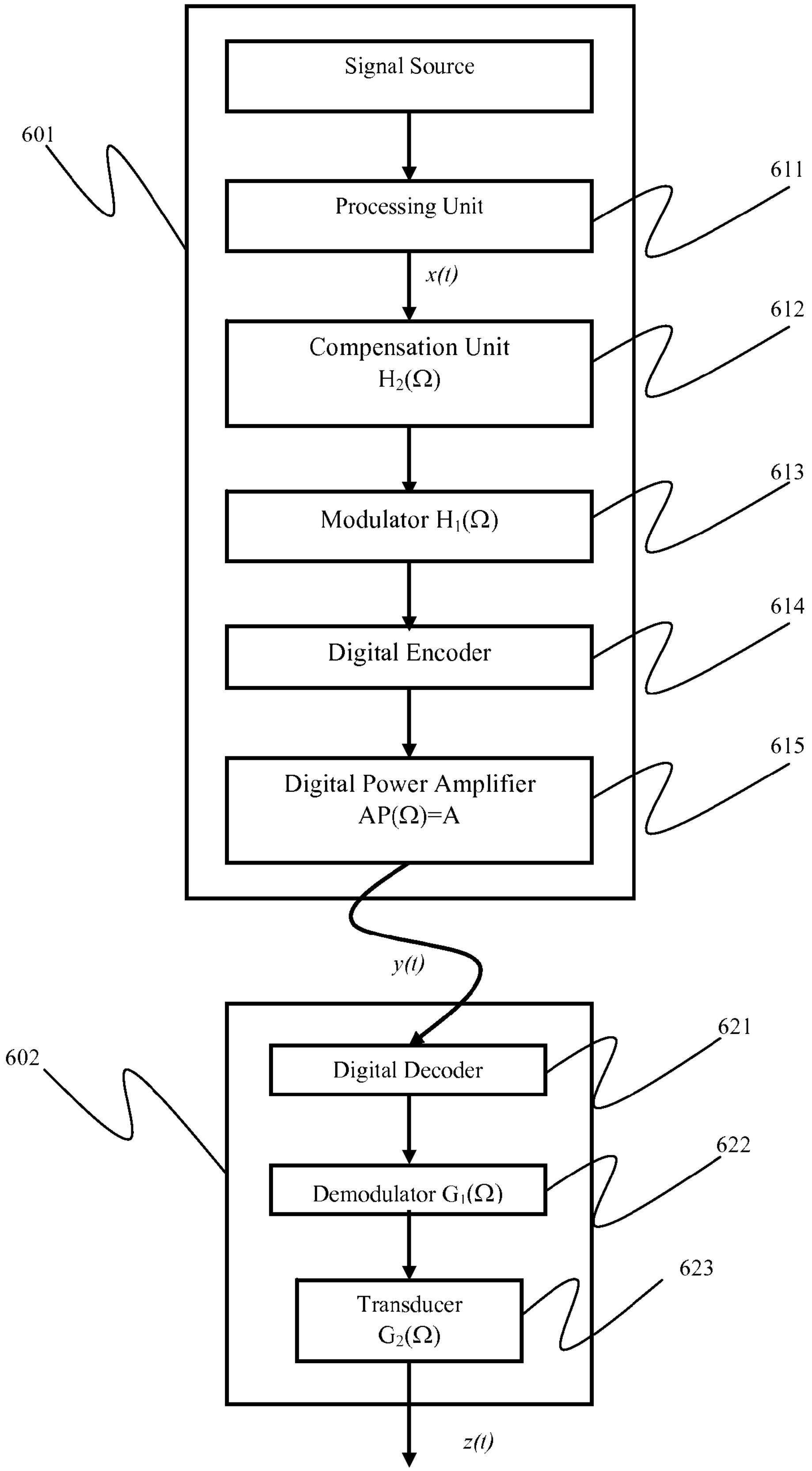
FIG. 6 is a block diagram of a system for media playback in accordance with another preferred embodiment of the present invention.

FIG. 6 shows the final solution in which a digital link is used to connect the sound reproduction system 601 and electroacoustic transducer system 602. The processing unit 611 performs music playback and content decompression. The compensation unit 612 has the same function as the compensation unit 212 in the system of FIG. 2A and 2B, and serves to compensate distortion caused by the transducer 623 in order to recover the equivalent original signal at the transducer output. The demodulator 622 has the same function as the demodulator 221 in the electroacoutic transducer system 204 of FIG. 2B, and serves to demodulate the signal from a modulator 613 and substantially eliminate the distortion introduced by the modulator 613 by providing an inverse function of the distortion. This is a modification of the above proposed method, wherein a digital encoder 614 encodes signal from modulator 613. The digital encoder 614 takes over the role of the digital-to-analog converter and the digital power amplifier 615 is used to amplify the digital encoded signal and drive the electroacoustic transducer system 602 through the digital connection wires. Such a connector output signal carries the distorted electrical audio signal, by modulation in pulse width, pulse amplitude, pulse frequency, etc. Moreover, some shaping noises, which are provided as carrier for the distorted electrical audio signal, can be modulated to the digital signal so that the ripped-off file size becomes huge and difficult to be compressed. The huge file size can be at least over several hundred megabytes in order to discourage unauthorized distribution over the Internet. On the receiver side, the electroacoustic transducer system 602 has decoder 621 decodes the digital signal and demodulator further demodulates the decoded signal into control and acoustic signals for the operation of the electroacoustic transducer 623. The control signal can be used to govern the supply current or voltage of the power, and to engage some operation modes for different content nature, monitor the operation safety, etc. of the electroacoustic transducer system 602.

In another preferred embodiment of the invention, the pulse amplitude can be used to control the volume of the audio reproduction in the electroacoustic transducer 602. For example, a larger amplitude pulse signal is used to drive a higher volume output in the electroacoustic transducer system 602.

In a further preferred embodiment of the invention, by monitoring the delivery current in the positive pulse interval, the power delivery in the electroacoustic transducer system 602 can be estimated, and hence designed with safety schemes (e.g. over power stop scheme) to protect audience hearing.

In yet another preferred embodiment of the invention, different digital signal patterns such as pulse-frequency are used to switch on or emphasize a dedicated set of electroacoustic transducers instead of other sets of electroacoustic transducer to suit different music content such as Jazz, Classic, etc.

In case the digital signal is ripped-off, the digital signal still cannot be played back in the third scenario, which involves sound reproduction system 101, proposed sound reproduction system 202 and 602. There must be a proprietary system for this tailored digital signal playback like the system 601, that is, it must work with the electroacoustic transducer 602 as decoder and demodulator.

The digital encoder 614 according to a preferred embodiment of the invention engages pulse-width-modulation (PWM) and the digital power amplifier 615 is a switching type transistor to provide PWM signal output with enough current to drive the electroacoustic transducer system 602.

Figure 7:
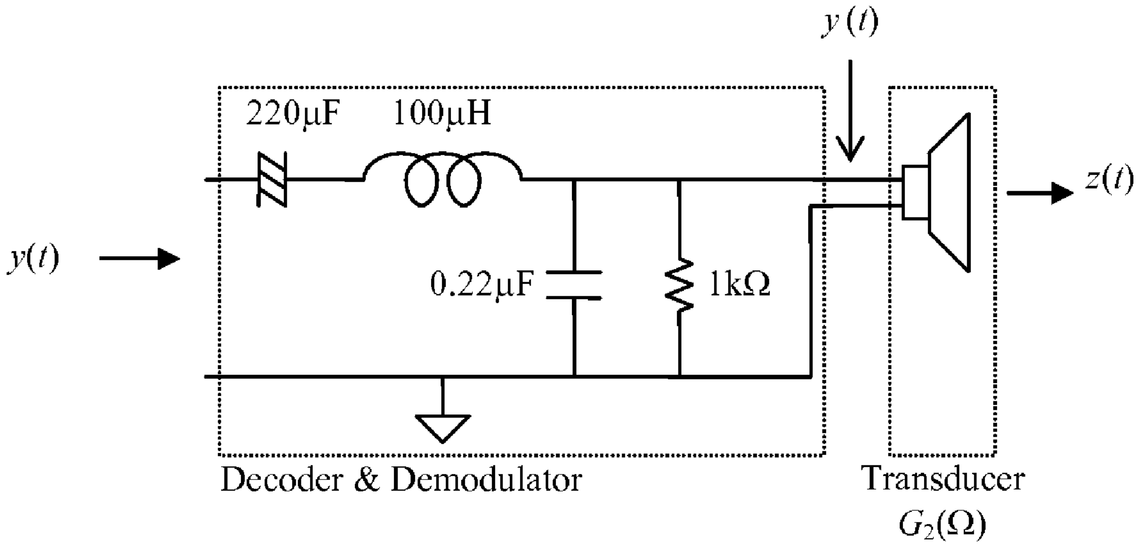
FIG. 7 is an equivalent-circuit schematic diagram of a transducer with decoder and demodulator according to the system illustrated in FIG. 6.

FIG. 7 shows an equivalent-circuit schematic diagram for the detailed arrangement of the (electroacoustic) transducer 602 in FIG. 6. y(t) is the distorted output and z(t) is the acoustic pressure output.

For the digital decoder 621 to match the above-mentioned encoder 614, a second order LC low-pass-filter equivalent circuit is implemented to convert the PWM signal into a powered analog signal y'(t), which drives the electroacoustic transducer 623 as shown in FIG. 7.

Finally, the present invention can be implemented in the multi-band frequency and the multi-channel of the audio content. In other words, this invention can be implemented in the multi-band frequency within a channel by repeating the implementation in each band frequency. As for the multi-channel case, it can be implemented by repeating the implementation in each channel such stereo, 5.1 channels, 6.1 channels, etc.

The proposed methods can be easily integrated into existing infrastructure because it is independent on the conventional Digital Rights Management scheme, the copy-protection scheme, the transaction security scheme, distributing infrastructure and media content format. The methods can be conveniently implemented in the output stage of the playback device and electroacoustic transducer.

INDUSTRIAL APPLICABILITY

The embodiments and arrangements described hereinafter are applicable to electronics, data transmission systems, computer systems, and media playback systems industries, amongst others.

The foregoing describes only a few preferred embodiments of the present invention, and modifications and/or substitutions can be made thereto without departing from the scope and spirit of the invention, the embodiments being illustrative and not restrictive.

I claim:

1. A media playback apparatus for protecting media content against unauthorized duplication at the output stage during media playback comprising:
- a digital signal source for providing an electrical signal representing undistorted media content;
- a processing unit for processing the signal from said signal source;
- a distorting unit for introducing non-linear distortion to the signal from said processing unit and outputting a distorted analog electrical signal such that the distorted analog electrical signal is perceived by a user as distorted on listening, wherein said non-linear distortion cures at least a non-linear distortion inherent to an electroacoustic transducer;
- the electroacoustic transducer for converting the distorted analog electrical signal from said distorting unit to undistorted energy representing said undistorted media content; and
- an electrical connection link for electrically transmitting the distorted analog electrical signal from said distorting unit to said electroacoustic transducer.

2. A media playback apparatus according to claim 1, wherein said distorting unit is a modulator; said media playback apparatus further comprises a demodulator for demodulating the signal from said modulator, said demodulator substantially eliminates the distortion introduced by said modulator.

3. A media playback apparatus according to claim 1, further comprising:
- a digital encoder coupled between said distorting unit and said connection link; and
- a digital decoder coupled between said connection link and said electroacoustic transducer;
- wherein said digital encoder encodes the signal from said distorting unit to a digital signal representing information by variation of characteristics selected from the group consisting of pulse width, frequency, and amplitude;
- said digital decoder decodes said digital signal into a signal equivalent to said signal output by said distorting unit.

4. A media playback apparatus according to claim 3, further comprising a digital-to-analog converter for converting the digital signal from said distorting unit to an analog signal.

5. A media playback apparatus according to claim 3, wherein said encoder further introduces a shaping noise to said digital signal for increasing the data rate of said digital signal.

6. A media playback apparatus according to claim 1, wherein said distorting unit introduces distortion selected from the group consisting of phase, amplitude and frequency.

7. A media playback apparatus according to claim 1, wherein said distorting unit introduces distortion in a multi-band manner.

8. A media playback apparatus according to claim 1, wherein said distorting unit introduces distortion in a multi-channel manner.

9. A media playback apparatus according to claim 1, wherein said media content is an audio signal.

10. A media playback apparatus according to claim 1, wherein said signal source is a means for data storage, broadcasting, or streaming data.

11. A method for media playback for protecting media content against unauthorized duplication, comprising:

providing an electrical signal source representing undistorted media content from a digital signal source;

processing the signal from said signal source by a processing unit;

non-linearly distorting the signal from said processing unit by a distorting unit, wherein said non-linear distortion cures at least a non-linear distortion inherent to an electroacoustic transducer;

outputting a distorted analog electrical signal from said distorting unit such that the distorted analog electrical signal is perceived by a user as distorted on listening;

converting said distorted analog electrical signal to undistorted energy representing said undistorted media content by the electroacoustic transducer; and electrically transmitting the distorted analog electrical signal from said distorting unit to said electroacoustic transducer through an electrical link.

12. A method for media playback according to claim 11, wherein said distorting step is a step of modulating; said method for media playback further comprises step of demodulating after said transmitting step; said demodulating step substantially eliminates the distortion introduced by said modulating step.

13. A method for media playback according to claim 11, further comprising:

encoding said distorted analog electrical signal into a digital signal before said transmitting step; and decoding said transmitted signal before said converting step;

wherein said encoding step encodes said distorted analog electrical signal to a digital signal representing information by variation of characteristics selected from the group consisting of pulse width, frequency, and amplitude;

said decoding step decoding said digital signal into a signal equivalent to said distorted analog electrical signal.

14. A method for media playback according to claim 13, further comprising the step of performing digital-to-analog conversion for converting said distorted signal in digital form to analog form.

15. A method for media playback according to claim 11, wherein said distorting step introduces distortion selected from the group consisting of phase, amplitude and frequency.

16. A method for media playback according to claim 11, wherein said distorting step introduces distortion in a multi-band manner.

17. A method for media playback according to claim 11, wherein said distorting step introduces distortion in a multi-channel manner.

18. A method for media playback according to claim 13, wherein said encoding step further introduces shaping noise to said digital signal for increasing the data rate of said digital signal.

19. A method for media playback according to claim 11, wherein said media content is an audio signal.

20. A method for media playback according to claim 11, wherein said signal source is a means for data storage, broadcasting, or streaming data.

* * * * *